(12) United States Patent
Rittmeyer et al.

(10) Patent No.: US 9,097,281 B2
(45) Date of Patent: Aug. 4, 2015

(54) BALL BEARING PARTICULARLY FOR USE IN HIGH SPEED GENERATOR

(75) Inventors: Gregory Alan Rittmeyer, Winnebago, IL (US); Liangheng Qiu, Lake in the Hills, IL (US); Paul G. Dennis, Roscoe, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 566 days.

(21) Appl. No.: 13/566,368

(22) Filed: Aug. 3, 2012

(65) Prior Publication Data

US 2014/0035409 A1 Feb. 6, 2014

(51) Int. Cl.
| | |
|---|---|
| H02K 7/08 | (2006.01) |
| F16C 33/46 | (2006.01) |
| F16C 33/38 | (2006.01) |
| F16C 33/51 | (2006.01) |
| F16C 33/44 | (2006.01) |
| F16C 19/06 | (2006.01) |

(52) U.S. Cl.
CPC ........... *F16C 33/3862* (2013.01); *F16C 33/445* (2013.01); *F16C 19/06* (2013.01); *F16C 2204/04* (2013.01); *Y10T 29/49009* (2015.01)

(58) Field of Classification Search
CPC ................................. F16C 33/38; F16C 33/50
USPC ............. 310/90; 308/201; 384/470, 530, 518, 384/570; 428/60, 609
See application file for complete search history.

(56) References Cited

U.S. PATENT DOCUMENTS

| | | | |
|---|---|---|---|
| 3,198,735 A | 8/1965 | Lamson et al. | |
| 3,843,962 A | 10/1974 | Bogue | |
| 5,222,816 A | 6/1993 | Kondoh et al. | |
| 5,262,216 A | 11/1993 | Popat et al. | |
| 5,833,373 A * | 11/1998 | Ueno et al. | 384/527 |
| 5,860,747 A | 1/1999 | Wan et al. | |
| 7,492,870 B2 | 2/2009 | Peterson, II et al. | |
| 7,806,596 B2 | 10/2010 | Shatz et al. | |
| 8,102,089 B2 | 1/2012 | Lemmers, Jr. et al. | |
| 8,136,996 B2 | 3/2012 | Lemmers | |
| 8,167,501 B2 | 5/2012 | Perkinson et al. | |
| 2009/0003749 A1* | 1/2009 | Bridges | 384/531 |
| 2012/0027335 A1* | 2/2012 | Schweitzer | 384/579 |

FOREIGN PATENT DOCUMENTS

| | | | |
|---|---|---|---|
| JP | 63254223 A | * | 10/1988 |
| JP | 10281163 A | * | 10/1998 |
| JP | 2007263279 A | * | 10/2007 |

* cited by examiner

*Primary Examiner* — Jose Gonzalez Quinone
(74) *Attorney, Agent, or Firm* — Carlson, Gaskey & Olds, PC

(57) ABSTRACT

A ball bearing has an outer race and an inner race A plurality of ball members are supported radially between the inner and outer races. A pair of bearing cage halves are placed at axial ends of the balls. The bearing cage halves are formed of a first relatively hard material, and have a plating of a softer material on some surfaces The bearing cage halves have pockets facing the balls and with the soft plating The bearing cage halves are riveted together along a contact surface, not including the soft plating. The rivets extend through an aperture in each of the bearing cage halves, not provided with the soft plating. The rivets have heads extending into a ditch, not provided with the soft plating. A rotor sub-assembly, a generator, and a method of maintaining a generator are also disclosed.

20 Claims, 3 Drawing Sheets

BALL BEARING PARTICULARLY FOR USE IN HIGH SPEED GENERATOR

BACKGROUND

This application relates to a ball bearing which has improved bearing life.

Ball bearings are known, and typically include a plurality of spherical balls spaced about a rotational axis. An outer race sits radially outwardly of the balls, and an inner race sits radially inwardly. One of the two races is connected to a rotating part, and the other to a part which will rotate relative to the rotating part. Typically, a shaft is attached to the inner race, and the outer race is secured within a housing. The balls support the rotating inner race for rotation, and the outer race supports the balls.

Typically, cages are placed at opposed axial sides of the balls.

The balls must be able to roll relative to the cages and between the races. If the balls catch, or are otherwise impeded from rotation, then the efficiency of the overall system is reduced.

It is known to coat the two halves of the cage, which is formed of steel, with a soft copper or nickel strike and silver plating prior to being assembled with rivets. The integrity of this riveted assembly may be reduced with the entire cage plated.

In addition, a clearance between an outer periphery of the cage and the inner periphery of the outer race has been generally equal to a clearance between a ball pocket on the cages and the outer periphery of the balls.

SUMMARY

A ball bearing has an outer race defining an inner peripheral bore. An inner race defines an outer peripheral bore. A plurality of ball members are supported radially between the inner and outer races, with the inner and outer races being centered on a shaft centerline. A pair of bearing cage halves are placed at axial ends of the balls. The bearing cage halves are formed of a first relatively hard material, and have a plating of a softer material on some surfaces of the bearing cages. The bearing cage halves have pockets facing the balls, with the soft plating being formed on the pockets. The bearing cage halves are riveted together along a contact surface, with the contact surface not including the soft plating. The rivets extend through an aperture in each of the bearing cage halves, and an inner surface of the aperture is also not provided with the soft plating. The rivets have heads extending into a ditch, and the ditch is not provided with the soft plating, at least at surfaces that sit beneath heads of the rivets. A rotor subassembly, a generator, and a method of maintaining a generator are also disclosed.

These and other features of this invention will be best understood from the following specification and drawings, the following of which is a brief description.

DETAILED DESCRIPTION

Figure 1:
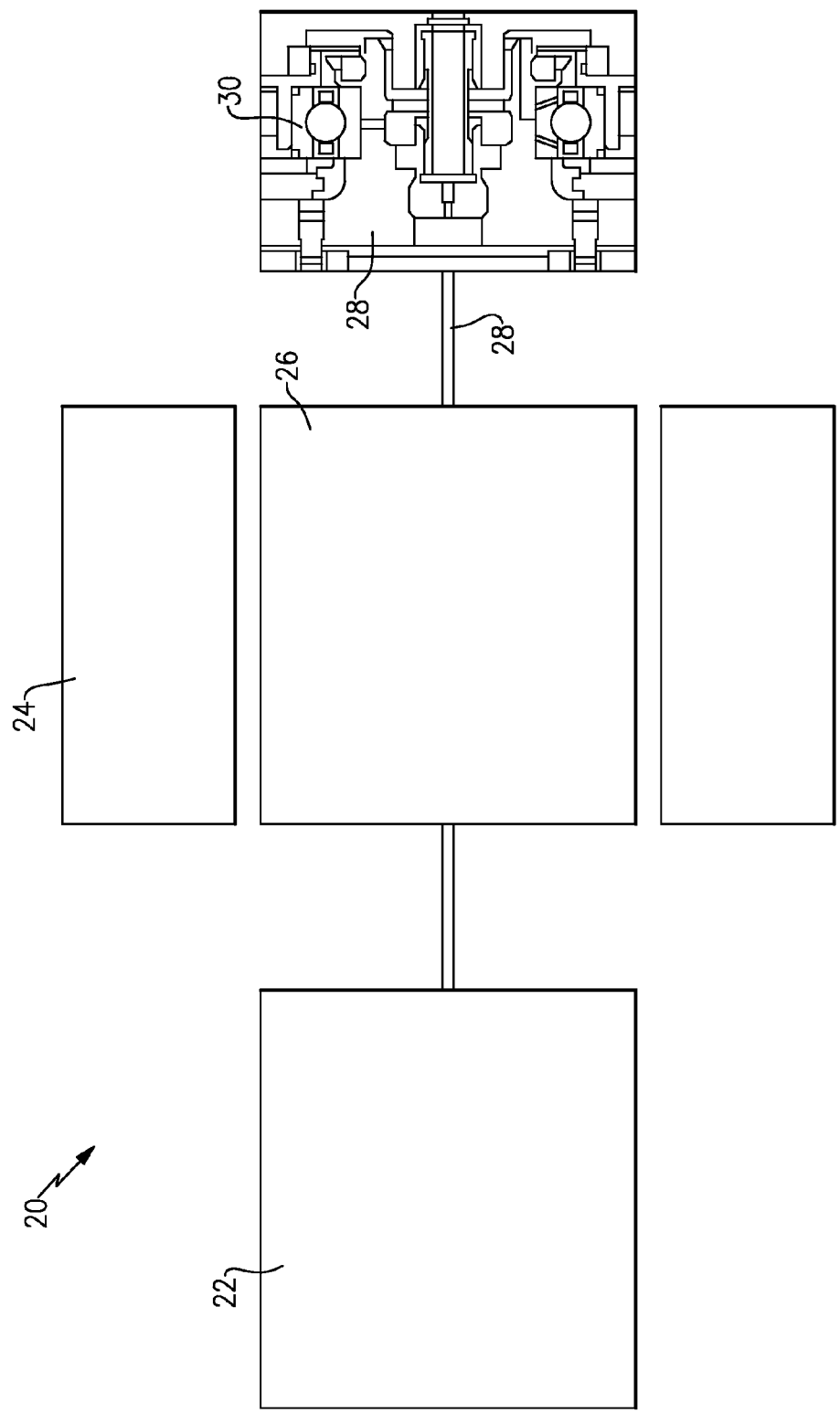
FIG. 1 schematically shows a generator incorporating a bearing.

A generator 20 is illustrated schematically in FIG. 1, and includes a drive source 22, such as a gas turbine engine gearing, and possibly a clutch to selectively drive a rotor 26. The rotor 26 rotates in proximity to stator windings 24. As is known, with this rotation, electricity is generated. On the other hand, the stator windings may be provided with current, and will drive the rotor 26 to rotate as a motor. A shaft 28 on a remote end of the rotor 26 from the drive source 22 is supported in a bearing 30.

Figure 2:
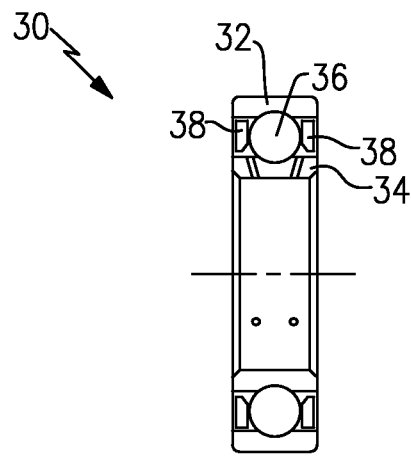
FIG. 2 is a view of a bearing.

Bearing 30 is illustrated in FIG. 2 as having an outer race 32 and an inner race 34. A plurality of spherical balls 36 are supported between the races 32 and 34. Cage halves 38 are placed at axial ends of the balls 36, and include pockets to support the balls.

Figure 3:
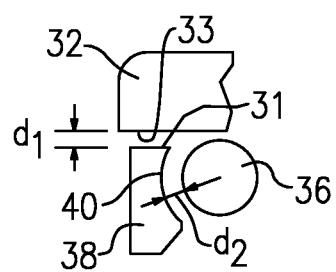
FIG. 3 shows a dimensional detail of the FIG. 2 bearing.

A pocket 40 is illustrated in FIG. 3, along with a spherical ball 36, and an outer race 32. A first clearance distance $d_1$ is defined between an outer periphery 31 of the cage 38 and an inner periphery 33 of the outer race 32.

A second clearance $d_2$ is defined between the pocket surface 40 and an outer periphery of the ball 36.

In the prior art, $d_1$ and $d_2$ have been equal. In fact, the stated clearances for this type device are diametral clearances, and include a corresponding clearance $d_1$ and $d_2$ at a diametrically opposed portion of the bearing. As an example, in one prior art bearing, a range for the diametral clearance $2d_1$ has been between 0.008"-0.014" (0.020 cm-0.035 cm). The $2d_2$ was also across that same diametral clearance range. Given that range, and allowing for tolerances, there has sometimes been less diametral clearance for $d_2$ than has existed for $d_1$, and applicant has discovered that this has undesirable results.

Thus, in embodiments of this invention, $2d_1$ is between 0.008"-0.012" (0.020 cm-0.030 cm) and $2d_2$ is between 0.014"-0.018" (0.035 cm-0.045 cm). That is, the entire range of $2d_1$ is selected to be less than the entire range of $2d_2$.

In embodiments, a ratio of $2d_1$ to $2d_2$ is between 0.44 and 0.86.

It should be understood that there are other types of bearings wherein the important clearance (or equivalent to $d_1$) is between the cage and the inner race. Some of the following features with regard to the coating would be applicable to such bearings, as would be the clearance ratios mentioned above.

Figure 4:
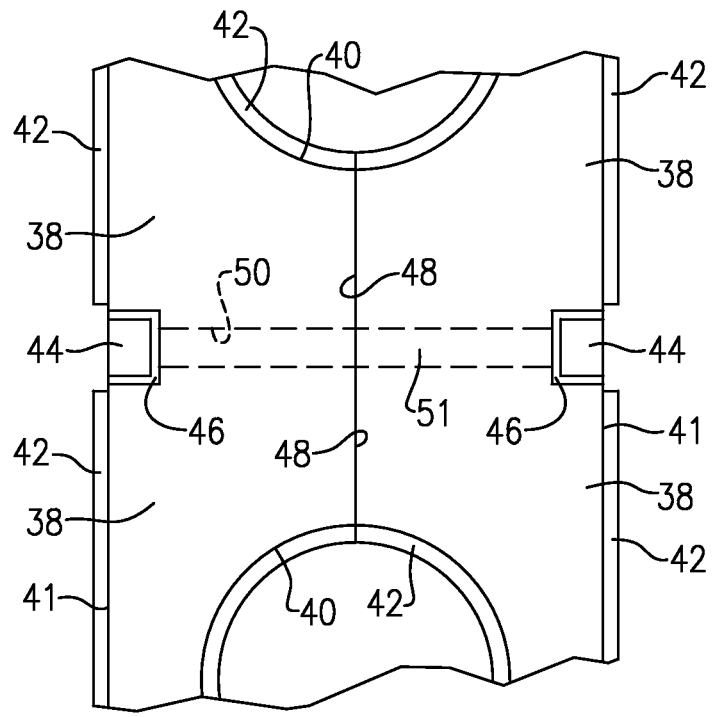
FIG. 4 shows a plating detail.
Figure 5:
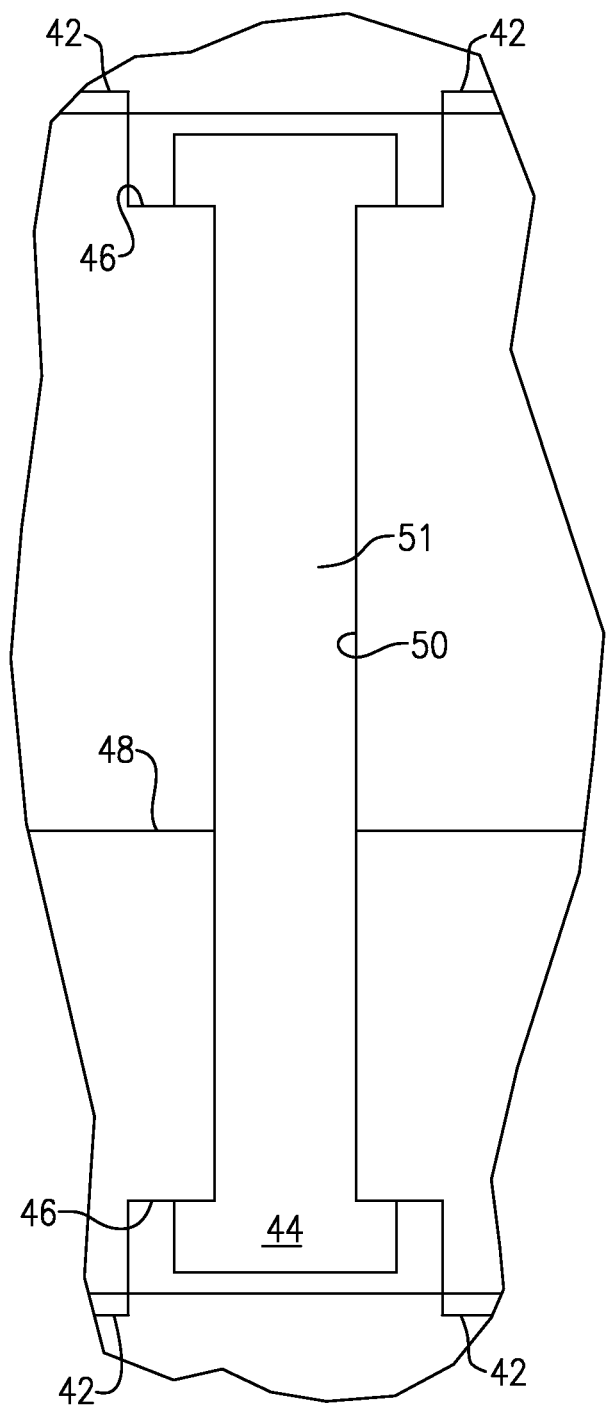
FIG. 5 is a view generally through a portion of the FIG. 4 view.

As shown in FIG. 4, the cage halves 38 are formed of a first relatively hard metal. A soft plating 42, which may be a soft silver plating, is deposited on the axially outer surfaces 41 of the cages 38, and along the ball pockets 40. In some applications, a nickel or copper strike may be deposited in a very thin layer beneath the soft silver plating. While this strike could cover the entire cage, in embodiments, it is only utilized where the soft silver plating is utilized, as described below. However, as is clear, a pocket or ditch 46 for receiving a rivet head is not plated. In addition, mating surfaces 48 of two opposed bearing cage halves 38 are not provided with the coating. In addition, a hole or aperture 50, which receives a rivet 51 is also not plated. Thus, as shown in FIG. 5, the surfaces associated with the rivet, and the surfaces that provide contact between the cage halves are not plated.

In a method according to this invention, a bearing having the dimensional relationships disclosed above between $2d_1$ to $2d_2$, and having the plating as set forth above, may be inserted into a generator to support a shaft for a generator rotor.

Although an embodiment of this invention has been disclosed, a worker of ordinary skill in this art would recognize that certain modifications would come within the scope of this invention. For that reason, the following claims should be studied to determine the true scope and content of this invention.

We claim:

1. A ball bearing comprising:
an outer race defining an inner peripheral bore;
an inner race defining an outer peripheral bore, with said inner and outer races being centered on a shaft centerline;
a plurality of ball members supported radially between said inner and outer races; and
a pair of bearing cage halves at axial ends of said plurality of ball members, and said bearing cage halves being formed of a first relatively hard material, and having a plating of a second, softer material on some surfaces of said bearing cage halves, said bearing cage halves having pockets facing said plurality of ball members, with said second, softer material being placed on said pockets, and said bearing cage halves being held together along a contact surface by rivets, with said contact surface not including said second, softer material, and said rivets each extending through an aperture in each of said bearing cage halves, and an inner surface of said apertures also not being provided with said second, softer material, and said rivets having heads in a ditch, with said ditches not being provided with said second, softer material, at least at surfaces that sit beneath said heads of said rivet.

2. The ball bearing as set forth in claim 1, wherein an outer periphery of said bearing cage halves is spaced from said inner peripheral bore of said outer race by a first clearance dimension, a second clearance dimension defined between said pockets of said bearing cages and an outer peripheral surface of said balls, and said first clearance dimension being less than said second clearance dimension.

3. The ball bearing as set forth in claim 2, wherein there is a range of tolerances for said first clearance dimension and a range of tolerances for said second clearance dimension, and a largest size of said first clearance dimension range is less than a smallest size of said second clearance dimension range.

4. The ball bearing as set forth in claim 2, wherein a ratio of twice said first clearance dimension to the second clearance dimension is 0.44-0.86.

5. The ball bearing as set forth in claim 1, wherein said second, softer material is a silver plating, and said first, relatively hard material is steel.

6. A rotor sub-assembly for a generator comprising:
a rotor winding and a shaft rotating for rotation with said rotor winding; and
a bearing supporting said shaft and having an outer race defining an inner peripheral bore, an inner race defining an outer peripheral bore with said inner and outer races being centered on a shaft centerline, a plurality of ball members supported radially between said inner and outer races, a pair of bearing cage halves at axial ends of said plurality of ball members, and said bearing cage halves being formed of a first relatively hard material, and having a plating of a second, softer material on some surfaces of said bearing cage halves, said bearing cage halves having pockets facing said plurality of ball members, with said second, softer material being placed on said pockets, and said bearing cage halves being held together along a contact surface by rivets, with said contact surface not including said second, softer material, and said rivets each extending through an aperture in each of said bearing cage halves, and an inner surface of said apertures also not being provided with said second, softer material, and said rivets having heads in a ditch, with said ditches not being provided with said second, softer material, at least at surfaces that sit beneath said heads of said rivet.

7. The sub-assembly as set forth in claim 6, wherein an outer periphery of said bearing cage halves is spaced from said inner peripheral bore of said outer race by a first clearance dimension, a second clearance dimension defined between said pockets of said bearing cages and an outer peripheral surface of said balls, and said first clearance dimension being less than said second clearance dimension.

8. The sub-assembly as set forth in claim 7, wherein there is a range of tolerances for said first clearance dimension and a range of tolerances for said second clearance dimension, and a largest size of said first clearance dimension range is less than a smallest size of said second clearance dimension range.

9. The sub-assembly as set forth in claim 7, wherein a ratio of twice said first clearance dimension to twice said second clearance dimension is 0.44-0.86.

10. The sub-assembly as set forth in claim 6, wherein said second, softer material is a silver plating, and said first, relatively hard material is steel.

11. A generator comprising:
a drive source, a stator winding, and a rotor winding, said rotor winding being selectively driven by said drive source, and driving a shaft; and
a bearing supporting said shaft, and having an outer race defining an inner peripheral bore, an inner race defining an outer peripheral bore with said inner and outer races being centered on a shaft centerline, a plurality of ball members supported radially between said inner and outer races, a pair of bearing cage halves at axial ends of said plurality of ball members, and said bearing cage halves being formed of a first relatively hard material, and having a plating of a second, softer material on some surfaces of said bearing cage halves, said bearing cage halves having pockets facing said plurality of ball members, with said second, softer material being placed on said pockets, and said bearing cage halves being held together along a contact surface by rivets, with said contact surface not including said second, softer material, and said rivets each extending through an aperture in each of said bearing cage halves, and an inner surface of said apertures also not being provided with said second, softer material, and said rivets having heads in a ditch, with said ditches not being provided with said second, softer material, at least at surfaces that sit beneath said heads of said rivet.

12. The generator as set forth in claim 11, wherein an outer periphery of said bearing cage halves is spaced from said inner peripheral bore of said outer race by a first clearance dimension, a second clearance dimension defined between said pockets of said bearing cages and an outer peripheral surface of said balls, and said first clearance dimension being smaller than said second clearance dimension.

13. The generator as set forth in claim 12, wherein there is a range of tolerances for said first clearance dimension and a range of tolerances for said second clearance dimension, and a largest size of said first clearance dimension range is less than a smallest size of said second clearance dimension range.

14. The generator as set forth in claim 12, wherein a ratio of twice said first clearance dimension to twice said second clearance dimension is 0.44-0.86.

15. The generator as set forth in claim 11, wherein said second, softer material is a silver plating, and said first, relatively hard material is steel.

16. The generator as set forth in claim 11, wherein said bearing is at a remote end of said rotor from said drive source.

17. A method of maintaining a generating comprising the steps of:

placing a shaft in a generator in a bearing, said bearing supporting said shaft, and said shaft rotating with a generator rotor winding; and the bearing having an outer race defining an inner peripheral bore, an inner race defining an outer peripheral bore with said inner and outer races being centered on a shaft centerline, a plurality of ball members supported radially between said inner and outer races, a pair of bearing cage halves at axial ends of said plurality of ball members, and said bearing cage halves being formed of a first relatively hard material, and having a plating of a second, softer material on some surfaces of said bearing cage halves, said bearing cage halves having pockets facing said plurality of ball members, with said second, softer material being placed on said pockets, and said bearing cage halves being held together along a contact surface by rivets, with said contact surface not including said second, softer material, and said rivets each extending through an aperture in each of said bearing cage halves, and an inner surface of said apertures also not being provided with said second, softer material, and said rivets having heads in a ditch, with said ditches not being provided with said second, softer material, at least at surfaces that sit beneath said heads of said rivet, an outer periphery of said bearing cage halves is spaced from said inner peripheral bore of said outer race by a first clearance dimension, a second clearance dimension defined between said pockets of said bearing cages and an outer peripheral surface of said balls, and said first clearance dimension being greater than said second clearance dimension.

18. The method as set forth in claim 17, wherein there is a range of tolerances for said first clearance dimension and a range of tolerances for said second clearance dimension, and a largest size of said first clearance dimension range is less than the smallest size of said second clearance dimension range.

19. The method as set forth in claim 17, wherein a ratio of twice said first clearance dimension to twice said second clearance dimension is 0.44-0.86.

20. The method as set forth in claim 17, wherein said bearing is at a remote end of said generator rotor winding relative to a drive source for said shaft.

* * * * *